Aug. 26, 1941.  J. E. DOPSON  2,253,768
CLAMP FOR WIRE FABRIC STRETCHERS
Filed April 9, 1941
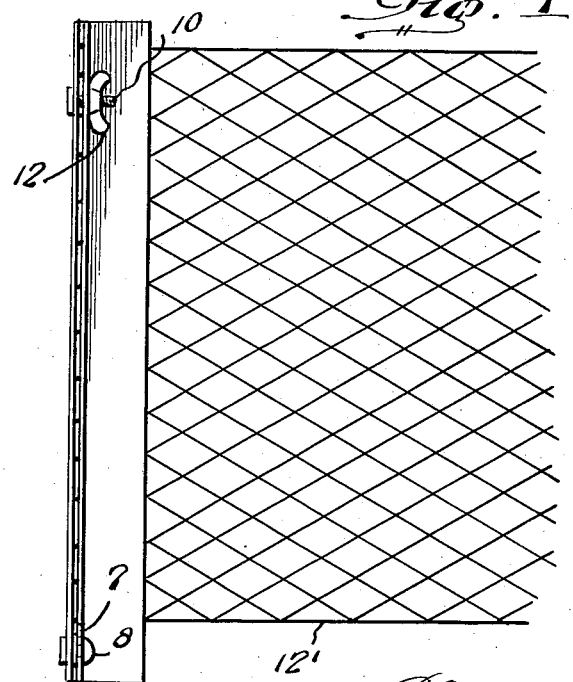
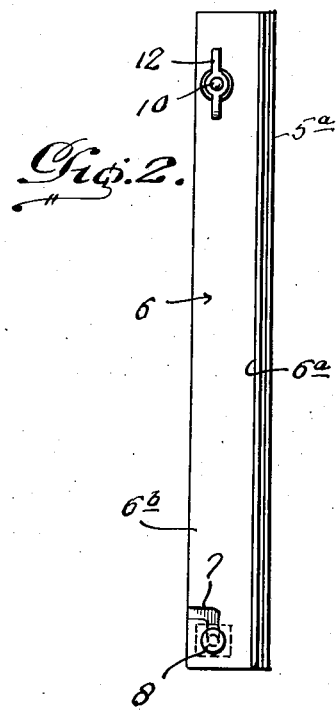
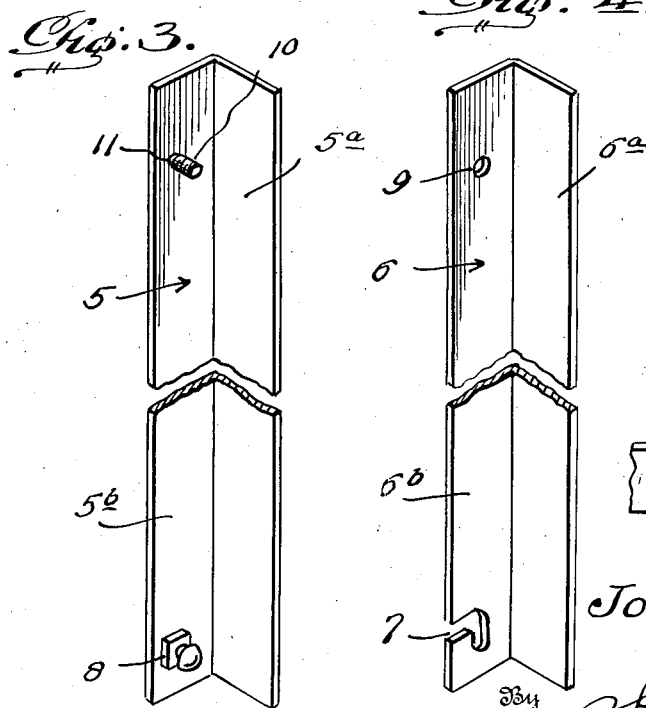
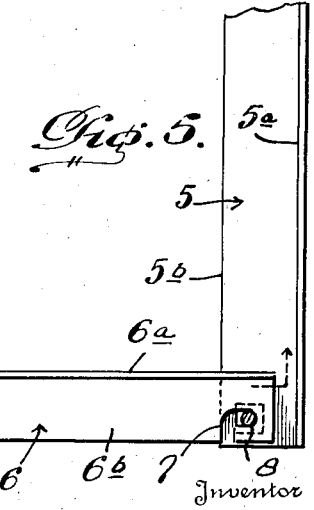
Inventor
John E. Dopson,
By J. Stanley Burch
Attorney Patented Aug. 26, 1941

2,253,768

UNITED STATES PATENT OFFICE 2,253,768

CLAMP FOR WIRE FABRIC STRETCHERS

John E. Dopson, Jacksonville, Ga.

Application April 9, 1941, Serial No. 387,775

3 Claims. (Cl. 254—83)

This invention relates to certain new and useful improvements in clamps for wire fabric stretchers, whereby wire mesh fabric may be effectively and uniformly stretched when used in erecting fences The primary object of the present invention is to provide a clamp of the above kind which is extremely simple and durable in construction, efficient in use, and capable of being readily and quickly manipulated for gripping the end of a length of wire mesh fabric to be stretched or to be conveniently and quickly disengaged from the fabric after stretching the same.

The present invention consists in the novel form, combination and arrangement of parts hereinafter more fully described, as shown in the accompanying drawing and claimed.

In the drawing:

Figure 1 is an elevational view of a clamp constructed in accordance with the present invention and engaged with the end of a length of wire mesh fabric;

Figure 2 is an elevation looking toward the left of Figure 1, with the wire fabric omitted;

Figure 3 is a perspective view, partly broken away, of the outer member of the clamp shown in Figures 1 and 2;

Figure 4 is a view similar to Figure 3 of the inner member of the clamp; and

Figure 5 is a fragmentary view somewhat similar to Figure 2, with the clamp in open position.

Referring in detail to the drawing, the present clamp consists of generally similar outer and inner clamping members 5 and 6, each consisting of a length of angle iron or equivalent angular material having corresponding flanges 5a and 6a constituting the jaws of the clamp and lateral flanges 5b and 6b adapted to be fastened together in gripping the end of a length of wire mesh fabric between said members 5 and 6, preparatory to stretching the wire mesh fabric in constructing a fence. Any suitable provision may be made for connecting a pulling device to the outer member 5 of the clamp so as to effect the stretching operation in a manner generally well known in the art.

As shown clearly in the several views, the inner clamping member 6 is provided near one end with an angular or bayonet slot 7 in the lateral flange 6b thereof adapted to receive the shank or stem 8 of a headed pin fixed to the corresponding end of the similar flange 5b of clamp member 5. Also, the flange 6b of clamp member 6 is provided near the other end with an aperture 9 adapted to receive the stem of a bolt 10 passed through an opening at 11 in the corresponding end of the flange 5b of clamp member 5. After the end of a length of fabric has been engaged between the clamp members and the shank of pin 8 has been engaged in the bayonet slot 7, a nut 12 is threaded on the stem of bolt 10 to complete fastening the clamping members together and drawing them tightly against the end of the length of wire fabric to grip the same. In use, the clamp member 5 is vertically disposed as shown in Figure 5 and the headed pin 8 has its shank engaged in the inner portion of slot 7 as shown in Figure 5, with the clamp member 6 disposed horizontally. The angularly bent end of a length of wire fabric 12' is then disposed against the inner faces of the flanges of clamp member 5, whereupon the clamp member 6 is swung upwardly into nested relation with the clamp member 5. Bolt 10 is then engaged in the openings 9 and 11 of the clamp members of 6 and 5 respectively, whereupon the nut 12 is threaded on the bolt 10 and tightened to effectively grip the end of the length of wire fabric. As the wire fabric will be uniformly gripped throughout the width thereof, it will be uniformly stretched when a pull is exerted upon the clamps. To disengage the clamps from the length of wire fabric, it is simply necessary to remove nut 12 from the bolt 10 and then swing the clamp member 6 downwardly to the position of Figure 5. When in this position, the clamp members may be separated, as desired, by simply sliding the clamp member 6 toward the flange 6a of clamp member 5 until the pin 8 is alined with the outer portion of slot 7. By then lifting clamp member 5, the pin 8 may be entirely disengaged from the slot 7 so that the clamp members may be separated. A reversal of this operation is followed in assembling the clamp members for use, and it will be seen that use of the clamps involves the manipulation of only one nut and bolt. Also, the construction is extremely simple and durable, and well adapted for efficient convenient use.

What I claim as new is:

1. A clamp for wire fabric stretchers, comprising generally similar inner and outer clamp members, each consisting of a length of angle iron and adapted to be arranged in nested relation and drawn together for gripping the angular end of a length of wire fencing preparatory to stretching the latter, one flange of the inner clamping member having an angular slot near one end thereof opening through the free longitudinal edge of the same and further having an aperture in said flange near the other end, the outer clamping member having an inwardly projecting headed pin on one flange thereof near one end of said flange and adapted to be removably engaged in said slot of the inner clamping member, the said flange of the outer clamping member also having an opening adapted to be registered with the opening in the flange of the inner clamping member, and a bolt adapted to pass through said openings, of the clamping members when registered and further adapted to receive a nut whereby the clamping members may be tightly drawn together for clamping the end of the wire fabric.

2. A clamp for wire fabric stretchers, comprising generally similar inner and outer clamp members, each consisting of a length of angle iron and adapted to be arranged in nested relation and drawn together for gripping the angular end of a length of wire fencing preparatory to stretching the latter, one flange of the inner clamping member having an angular slot near one end thereof opening through the free longitudinal edge of the same and further having an aperture in said flange near the other end, the outer clamping member having an inwardly projecting headed pin on one flange thereof near one end of said flange and adapted to be removably engaged in said slot of the inner clamping member, the said flange of the outer clamping member also having an opening adapted to be registered with the opening in the flange of the inner clamping member, and a bolt adapted to pass through said openings, of the clamping members when registered and further adapted to receive a nut whereby the clamping members may be tightly drawn together for clamping the end of the wire fabric, said slot and said headed pin being provided near corresponding ends of the flanges of said clamp members so that the inner clamping member is capable of longitudinal sliding movement for engagement of the headed pin or disengagement of the same from said slot.

3. A clamp for wire fabric stretchers, comprising generally similar inner and outer clamp members, each consisting of a length of angle iron and adapted to be arranged in nested relation and drawn together for gripping the angular end of a length of wire fencing preparatory to stretching the latter, one flange of the inner clamping member having an angular slot near one end thereof opening through the free longitudinal edge of the same and further having an aperture in said flange near the other end, the outer clamping member having an inwardly projecting headed pin on one flange thereof near one end of said flange and adapted to be removably engaged in said slot of the inner clamping member, the said flange of the outer clamping member also having an opening adapted to be registered with the opening in the flange of the inner clamping member, and a bolt adapted to pass through said openings, of the clamping members when registered and further adapted to receive a nut whereby the clamping members may be tightly drawn together for clamping the end of the wire fabric, said headed pin cooperating with said slot to permit pivotal movement of the inner clamping member relative to the outer clamping member to facilitate engagement of the end of the wire fabric between the clamping members preparatory to arranging them in nested relation and drawing them together.

JOHN E. DOPSON.